(12) United States Patent (10) Patent No.: US 6,685,214 B2
Gregory (45) Date of Patent: Feb. 3, 2004

(54) FOLDING CART

(76) Inventor: Joseph A. Gregory, 213 Prince Ct., Kingston, NY (US) 12401

( * ) Notice: Subject to any disclaimer, the term of this patent is extended or adjusted under 35 U.S.C. 154(b) by 0 days.

(21) Appl. No.: 09/877,750

(22) Filed: Jun. 11, 2001

(65) Prior Publication Data

US 2002/0185844 A1 Dec. 12, 2002

(51) Int. Cl.$^7$ .................................. B62B 1/04
(52) U.S. Cl. ...................... 280/652; 280/47.29
(58) Field of Search ........................... 280/38, 40, 645, 280/646, 651, 652, 654, 655, 655.1, 47.24, 47.27, 47.28, 47.29, 79.11

(56) References Cited

U.S. PATENT DOCUMENTS

| | | | | |
|---|---|---|---|---|
| 2,687,894 A | * | 8/1954 | Stoddard | 280/646 |
| 2,757,935 A | * | 8/1956 | Sofia | 280/654 |
| 4,275,894 A | * | 6/1981 | Mortenson | 280/47.29 |
| 4,830,385 A | * | 5/1989 | Wallick et al. | 280/47.24 |
| 4,907,674 A | * | 3/1990 | Miller | 280/47.27 |
| 5,263,727 A | * | 11/1993 | Libit et al. | 280/646 |
| 5,439,239 A | * | 8/1995 | Su | 280/47.29 |
| 5,526,894 A | * | 6/1996 | Wang | 280/646 |
| 5,626,351 A | * | 5/1997 | Tsai | 280/655 |
| 5,984,327 A | * | 11/1999 | Hsieh et al. | 280/47.24 |
| 6,173,811 B1 | * | 1/2001 | Tornabene et al. | 280/47.28 |

* cited by examiner

Primary Examiner—Frank Vanaman

(57) ABSTRACT

A cart for transporting various articles, most particularly sporting goods such as ski and golf equipment, that folds into a compact package for storage including a handle folds down and a shelf that folds up and wheels that can be rotated so as to be aligned in a common plane against the frame of the cart.

5 Claims, 6 Drawing Sheets ial/wing # FOLDING CART

RELATED DOCUMENTS

This application is based upon information filed under the Disclosure Document Program on Feb. 9, 2001 as Disclosure Document Number 488491.

BACKGROUND OF THE INVENTION

1. Field of the Invention

This invention relates to carts for moving a variety of goods and more particularly to a cart which is readily folded for transport and storage.

2. Prior Art and Objects of the Invention

Skis are notably difficult to handle being long and awkward to carry. Along with the skis, ski boots and poles, an equipment bag is also essential to carry such items as goggles, caps and gloves. With all of this equipment to carry, the trip from the parking lot to the lodge of a ski center can be difficult and precarious.

In playing golf, carts have long been an essential part of golf equipment. However, carts which are pulled to carry equipment including golf clubs and golf bag, are not easily transportable in an automobile.

A cart on which all the equipment could be securely stowed and which could be easily pulled with all the necessary sports equipment on it would fill a long felt need. Such a cart would need to be light and compact. Of greatest importance, it would have to be capable of being folded so as to require minimal space when not in use and when being transported in an automobile. While skiing the cart could be compactly stored while with golf, the cart would be used during the playing of the game. In both situations, the cart could be easily carried and readily stored when not being used.

It should be understood that many other uses for a compact cart, besides golf and skiing, are possible and in fact are almost unlimited. However, skiing and golf provide two areas of use encompassing both winter and summer. Such a cart is not known or available.

Accordingly, it is an object of the present invention to provide a cart for carrying a variety of equipment.

It is another object of the present invention to provide a cart for carrying ski and snow board and golf equipment.

It is another object of the present invention safely to retain articles to prevent others from falling over the articles if placed to one side.

It is another object of the present invention to provide a cart that is light and is easily folded into a compact unit for storage.

These and other objects will be apparent to those skilled in the art based upon the description of the preferred embodiment.

SUMMARY OF THE INVENTION

A cart is provided for transporting various items most particularly sports equipment such as ski and snow board and golf equipment. The structural base for the cart is a frame which includes a cross bar and two wheel bars generally parallel to one another and extending substantially at right angles from the ends of the cross bar. Journals are mounted to rotate on the wheel bars and wheel plates extend from the journals to which the wheel plates are secured. The wheel plates taper from the journal to an outside end which is generally rounded. An axle is secured to each of the wheel plates at the outside end and a wheel is mounted on each axle to rotate. On these two wheels, the cart can be readily pulled.

To use the cart, the wheel plates are placed parallel to one another and locked into position. For storage purposes, the wheels can be rotated toward one another against the frame and are then locked in that position.

A handle extends from the frame and the handle folds downwardly and backwardly for storage. A cradle is mounted on the handle to retain items in place and the cradle may be modified to accommodate different items. Straps may be used to secure the various items to the handle and on the shelf.

A shelf is mounted on the cart on the opposite side of the cart from the wheels to rotate generally ninety degrees from a vertical position to a horizontal position with the cart in an upright position. A locking means is used to retain the shelf in its lower or operating position.

DETAILED DESCRIPTION OF THE PREFERRED EMBODIMENT

Figure 1:
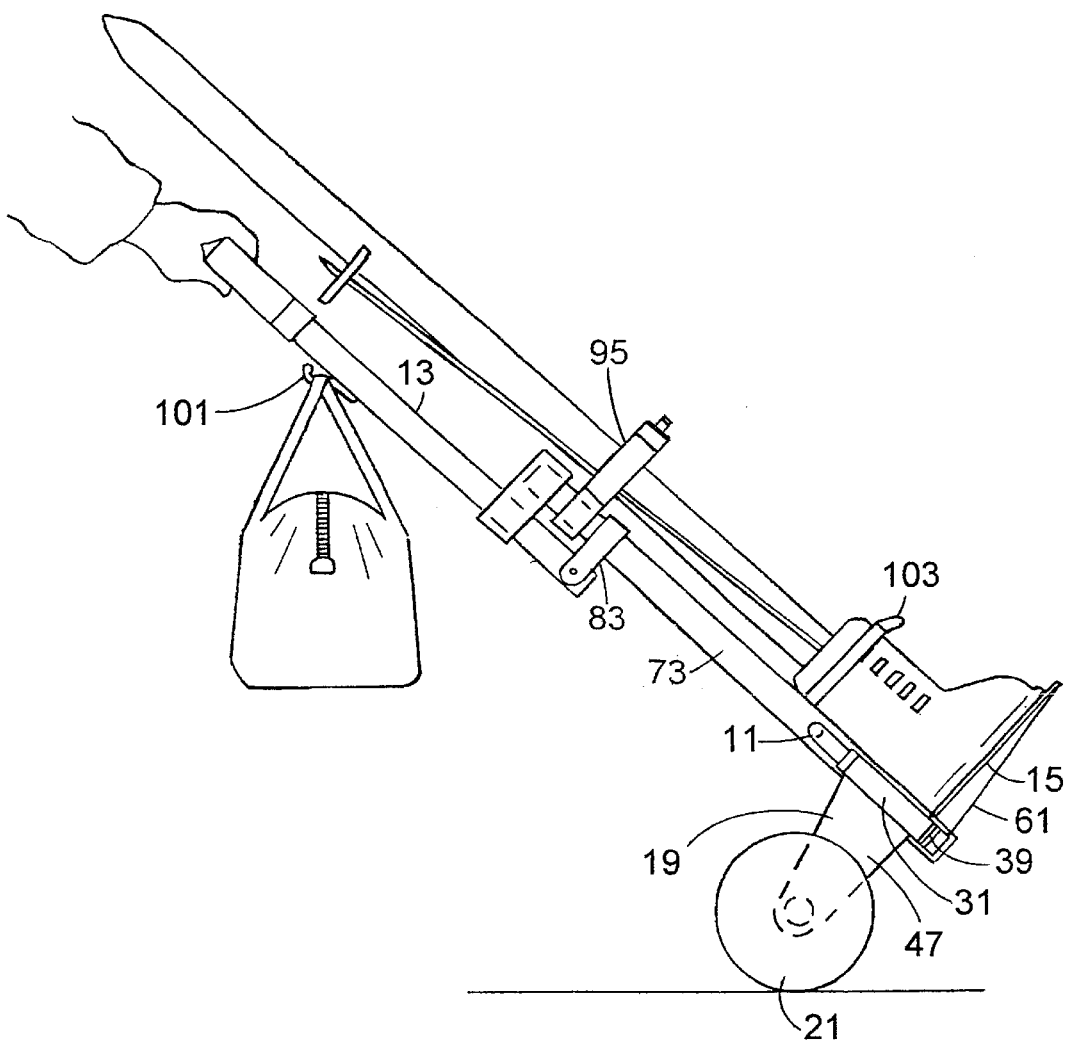
FIG. 1 is a side view of the cart being used to transport ski equipment with the handle extended and the shelf down and the cart tipped back to be pulled.
Figure 2:
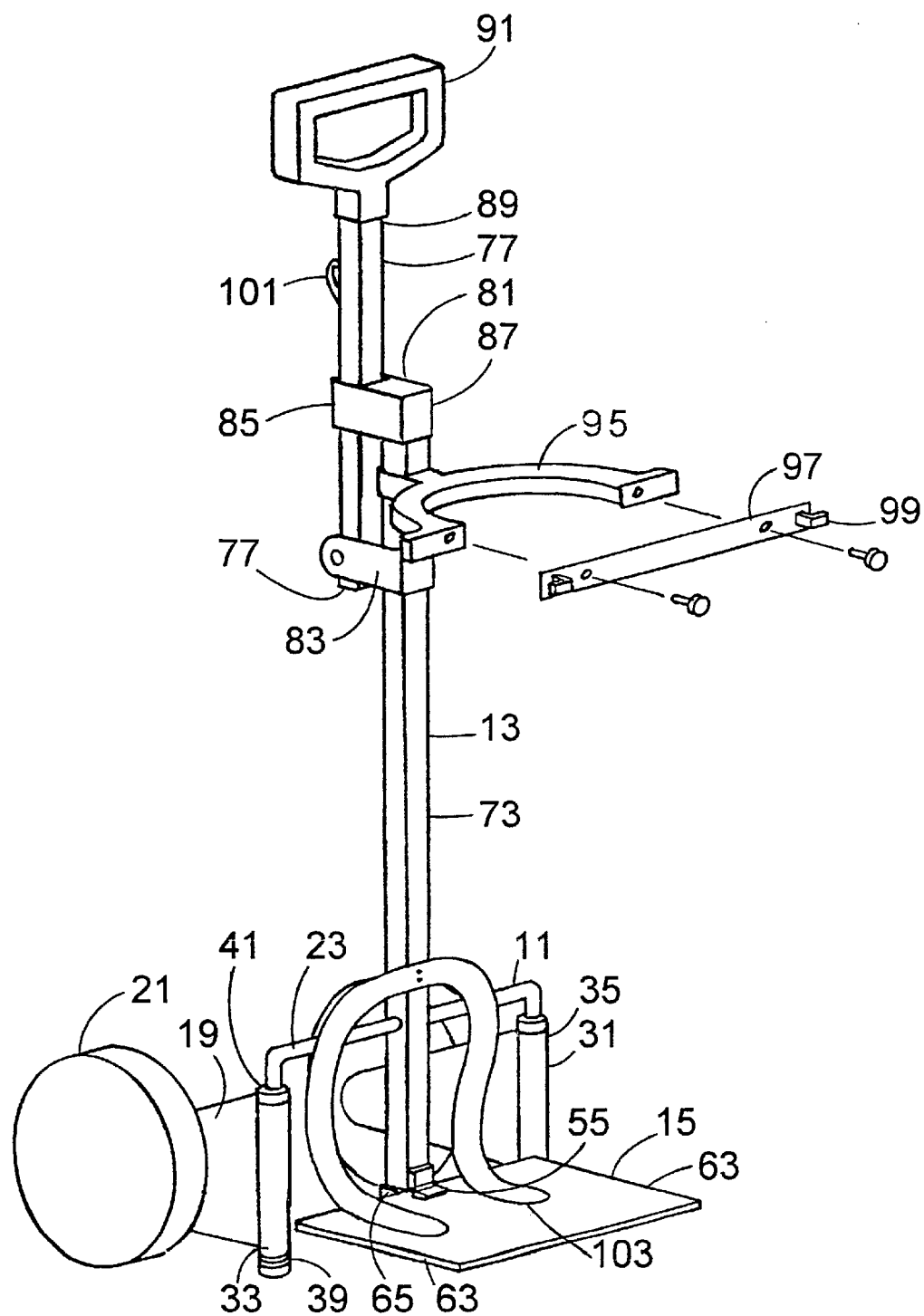
FIG. 2 is a pictorial view from the side and front of the cart with the cart in an upright position but with the handle extended and showing in exploded form an modification member which can be added to the cradle so as to make the cart more suitable for use in carrying a snow board.
Figure 3:
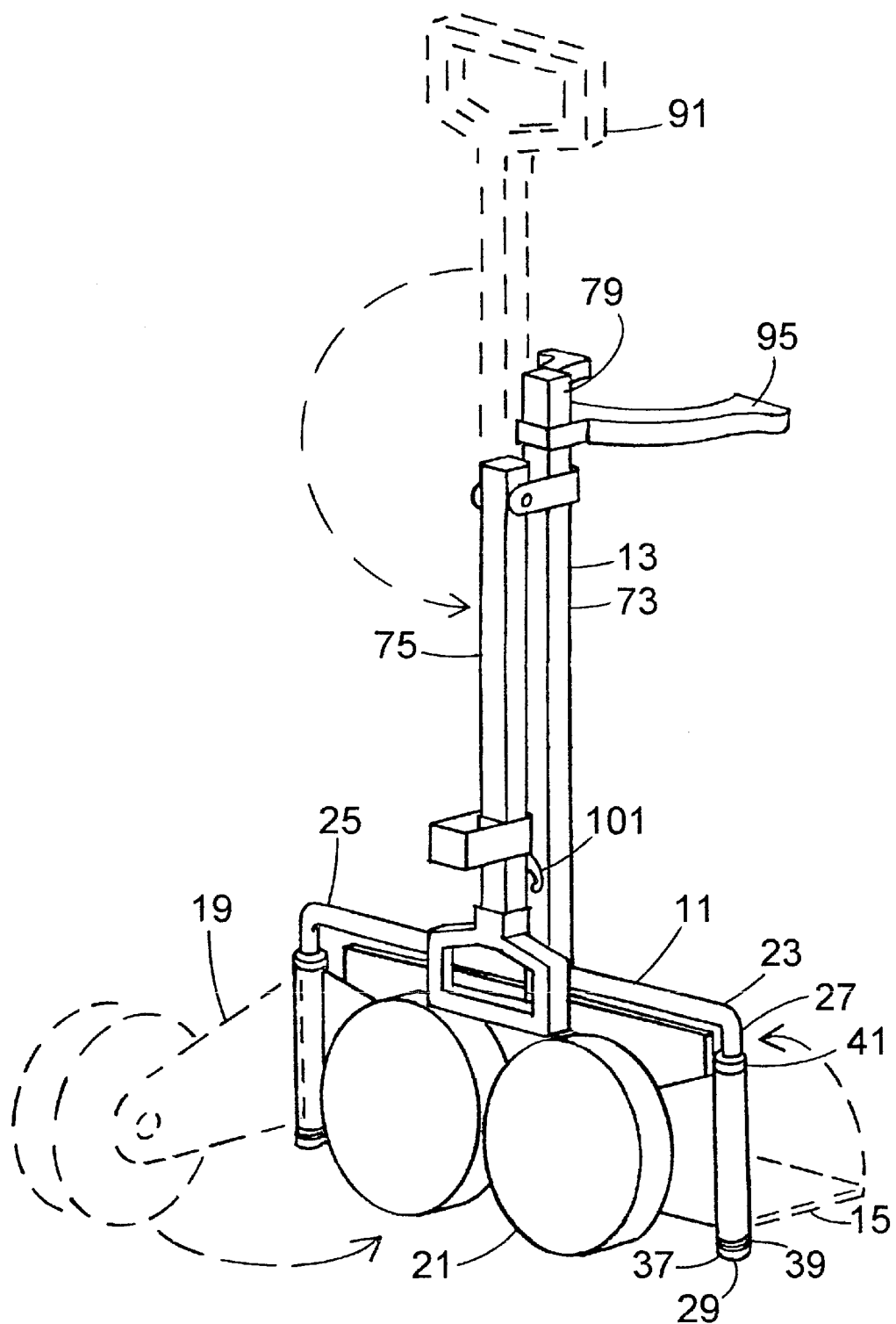
FIG. 3. is a pictorial view from the side and rear showing the wheels in their stored position but with one wheel shown in italics in its operating position and also showing the handle folded down for storage with the handle in its upright position shown in italics.

Referring now to FIGS. 1, 2 and 3, the cart is shown and the cart includes a frame 11, a handle 13, a platform or shelf 15 and a wheel assembly 19 including wheels 21. The handle 13 is secured to the frame 11 at the center point of the frame 11 between the two wheels 21. The frame 11 is an inverted U-shaped member including a cross bar 23 and two wheel bars 25, each wheel bar 25 is attached at its upper end 27 to opposite ends of the cross bar 23 generally at right angles to the cross bar 23 and substantially parallel to one another. The opposite end of each wheel bar 25 is the lower end 29 of the wheel bar 25. The handle 13 is securely affixed to the cross bar 23, as stated, midway between the two wheel bars 25.

For purposes of reference, the back of the frame 11 is where the wheels 21 are located and the front of the frame 11 is where the shelf 15 is located.

Figure 4:
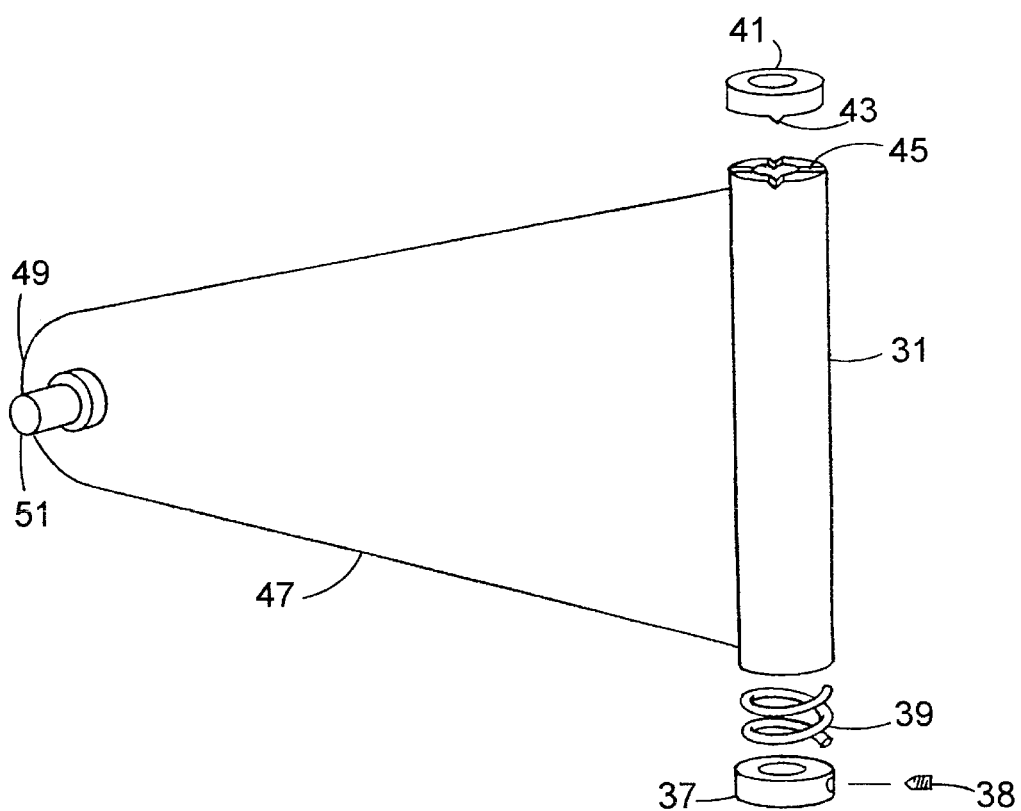
FIG. 4 is a pictorial view partially exploded showing the journal and the outer collar with the lugs and indentations used to lock the wheels in selected positions.

The wheel assembly 19 is mounted on each of the two wheel bars 25. Each wheel assembly 19 includes a journal 31 mounted on each wheel bar 25 so as to rotate on the wheel bar 25. The journal 31 has a lower end 33 adjacent the lower end 29 of the wheel bar 25 and an upper end 35 opposite from the lower end 33. An end collar 37 is secured to the lower end 29 of each wheel bar 25 by a set screw 38. A spring 39 is placed between each end collar 37 and the journal 31 to force the journal 31 away from the end collar 37. An upper collar 41 is secured to the upper end 27 of the wheel bars 25. The upper collar 41 has lugs or projections 43, as shown in FIG. 4, and the upper end 35 of the journal 31 has indentations 45 which mate with the lugs 43 causing the journal 31 to lock to the upper collar 41 at ninety degree intervals thus preventing rotation of each journal 31. However, when each journal 31 is pressed toward its respective end collar 37 against the spring 39, each entire wheel assembly 19 including the wheel 21 may be rotated and then may be locked in a different position by the same lugs 43 and indentations 45.

A wheel plate 47, which is part of the wheel assembly 19, is secured to each of the two journals 31. The wheel plate 47 generally tapers from the journal 31, to which it is secured, to a rounded end 49. At the rounded end 49, an axle 51 is secured to the wheel plate 47 on which the wheel 21 is mounted to rotate. The two wheels 21 so mounted serve to roll the cart by pulling. When the wheels 21 are set to serve as a basis to roll the cart, the two wheel plates 47 are parallel as shown in FIG. 2. When the cart is being stored, the wheels 21 are folded against the frame 11 as seen in FIG. 3. and are aligned with one another. The wheels 21 may be moved from the operation position, to the storage position as has been previously explained, by depressing the journal 31 against the spring 39 to release the lugs 43 from the indentations 45.

The shelf or platform 15 is centrally mounted on the handle 13 slightly forward of the two wheel bars 25. A hinge 55 is used to secure the shelf 15 to the handle so that the shelf 15 can be rotated up against the handle 13 and down approximately ninety degrees when in use. The shelf 15 may be mounted to rotate on the cart in any number of ways.

Figure 5:
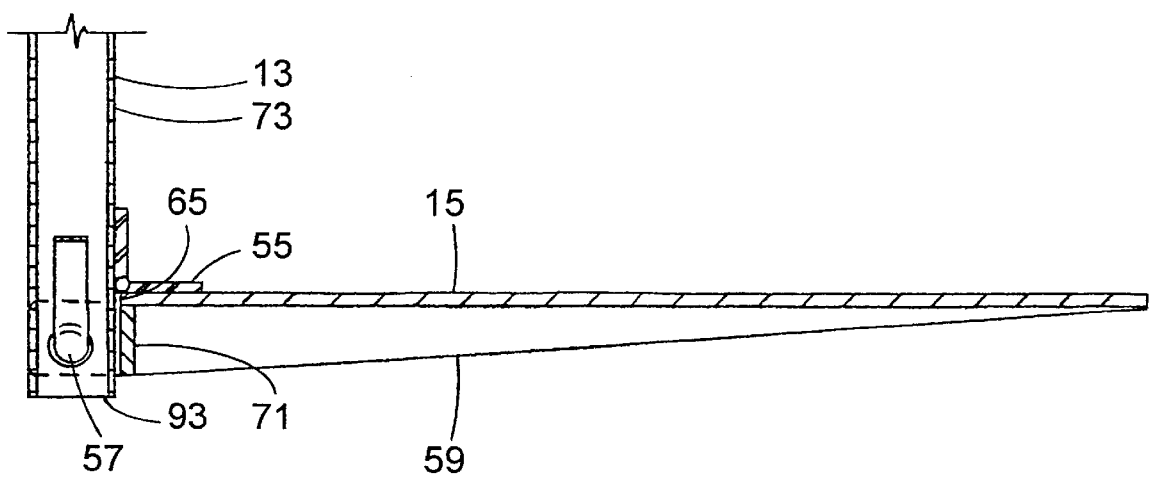
FIG. 5 is a side elevation of the shelf view showing the locking mechanism for the shelf and for limiting the movement of the shelf.
Figure 5A:
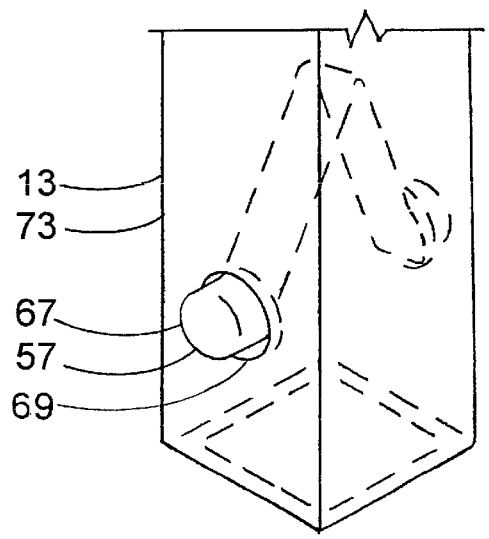
FIG. 5A is an enlarged pictorial view of the locking mechanism shown in FIG. 5.
Figure 6:
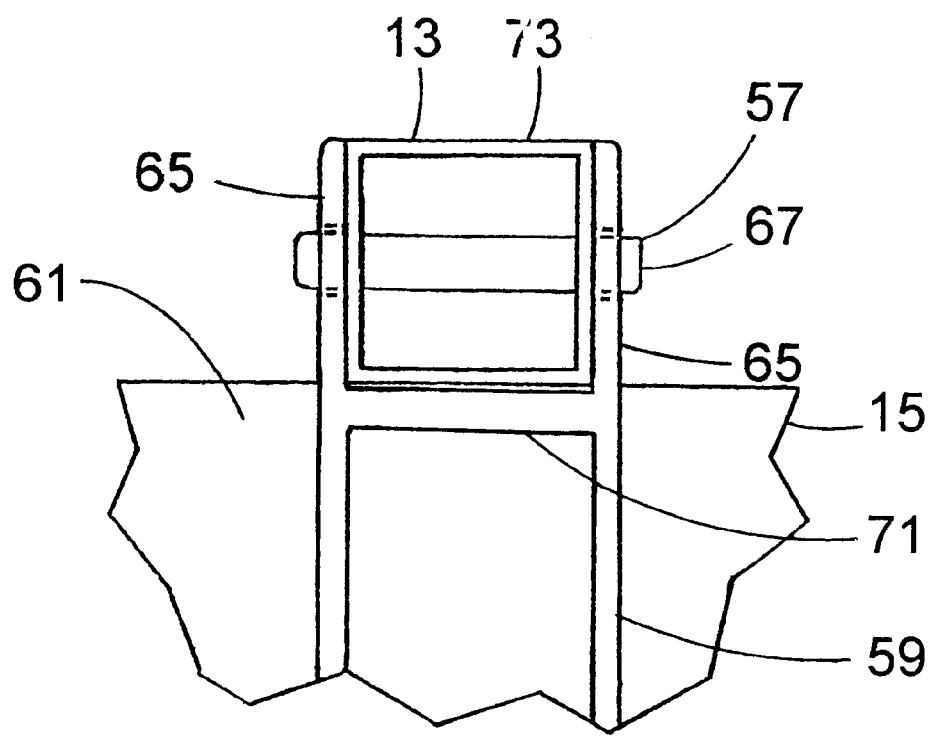
FIG. 6 is a plan view of the underside of the shelf showing the plates affixed to the shelf and the locking mechanism.

When the shelf 15 is its lowered position and particularly when is use, it is important that the shelf 15 not rotate back up toward the frame 11 as might occur if the shelf 15 struck a curb. To assure that the shelf 15 will not improperly rotate when is use, a lock 57 is provided as seen in FIGS.5, 5A and 6. A pair of tapered plates 59 on the underside 61 of the shelf 15 are located generally parallel to the side edges 63 of the shelf 15 and extend past the rear edge 65 of the shelf 15 to slide along the sides of the handle 13 in close proximity to the handle 13. A pair of spring-loaded projections 67 engage openings 69 in the tapered plates 59 securing the shelf 15 in its lowered position. A stop bar 71 across the tapered plates 59 strikes the handle 13 to stop the shelf 15 in its desired lowered position, generally at ninety degrees from the upright position of the shelf 15 when not in use.

The handle 13 in its operating position can best be seen in FIG. 1. The handle 13 has a lower section 73 and an upper section 75. The lower end 77 of the upper section 75 is secured to the upper end 79 of the lower section 73 by a retaining assembly 81. The upper section 75 and the lower section 73 are aligned with one another but are offset from one another. A hinge member 83 is secured to lower section 73 of the handle 13 towards the upper end 79 of the lower section 73. The upper section 75 of the handle 13 is mounted to pivot on the hinge member 83. A retaining member 85 is mounted to slide on the upper section 75 of the handle 13 and the retaining member 85 includes a socket 87. The retaining member 85, with the upper section 75 of the handle 13 in the operating position, slides downwardly so that the socket fits over the upper end 79 of the lower section 73 of the handle 13 thereby retaining the upper section 75 as a rigid extension of the lower section 73. By lifting the retaining member 85 upwardly, the upper section 75 of the handle 13 may be folded over the back of the cart as seen in FIG 3.

The upper section 75 of the handle 13 at its upper end 89, most remote from the lower section 73, includes a hand grip 91. The lower section 73 is secured to the frame 11 as has been previously described and, as seen in FIGS. 2 and 5, the lower section 73 extends to a lower end 93 beneath the cross bar 23 below the shelf 15 and serves, as also previously discussed, to permit the lock 57 to secure the shelf 15 in its lowered position.

Again referring to FIG. 1, a cradle 95 is secured to the lower section 73 of the handle 13 but above the hinge member 83. The cradle 95, as seen in FIG. 3, is designed to retain articles such as skis, as shown in FIG. 1. When used for larger articles such as a snow board, a broader support is preferable and, seen in FIG. 2, a cradle modifier 97, that is a flat and elongated plate is placed on the cradle 95. The cradle modifier 97 includes hooks 99 at each end to retain the snow board in place by means of hooked expansible straps (not shown). A hook 101 (FIG. 1) on the back of the upper section 75 of the handle 13 provides a means to hold a bag. Straps 103 affixed to the cart are provided to retain articles being transported, to secure the articles in place when in transit.

It is to be understood that the drawings and description matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. A cart that may be folded for storage and unfolded for transporting various articles, said cart comprising:

a frame having a cross bar and two wheel bars located at opposite ends of the cross bar, the frame having a front and a back, each wheel bar having a lower end remote from the cross bar;

a pair of end collars mounted on the lower ends of the wheel bars;

a pair of journals, each journal being mounted to rotate on a wheel bar;

means for locking each journal in a selected position on its respective wheel bar, which means includes a spring located on each wheel bar between the end collar and the journal and an upper collar secured to the wheel bar above the journal, the journal and the upper collar having interacting lugs and indentations;

a wheel plate secured to each journal;

an axle mounted on each wheel plate;

a wheel mounted to rotate on each axle;

a handle rigidly secured to the cross bar generally equidistant between the pair of wheels, the handle having a lower section extending below the cross bar and generally midway between the two wheel bars and an upper section having a lower end hinged to the lower section and having a means to secure the upper section to the lower section;

a shelf mounted to rotate on the cart from an upper position against the cart to a lower position generally at ninety degrees from the upper position, the shelf having an underside;

a cradle affixed to the lower section of the handle to retain the articles; and a hanger mounted on the upper section of the handle over the back of the frame.

2. A cart according to claim 1 further including:

means for securing the shelf when rotated to the lower position including:
- a pair of plates secured to the underside of the shelf, the pair of plates being parallel and extending adjacent the handle, each parallel plate having an opening in it; and
- a pair of retractable plungers mounted in the handle to engage the openings in each of the parallel plates.

3. A cart according to claim 1 wherein the means to secure the upper section of the handle to the lower section of the handle includes a retaining member, the retaining member being mounted to slide on the upper section of the handle and to engage the lower section of the handle.

4. A cart that may be folded for storage and unfolded for transporting various articles, said cart comprising:

- a frame having a cross bar and two wheel bars located at opposite ends of the cross bar, the frame having a front and a back, each wheel bar having a lower end remote from the cross bar, the wheel bars being generally at right angles to the cross bar and generally parallel to one another;
- a pair of journals, each journal being mounted to rotate on a wheel bar;
- a wheel plate secured to each journal;
- an axle mounted on each wheel plate;
- a wheel mounted to rotate on each axle;
- an end collar mounted on the lower end of each wheel bar beneath the journal;
- a spring located between the journal and the end collar;
- an upper collar mounted on each wheel bar above the journals, each journal and upper collar having protrusions and indentations to prevent the journal from rotating;
- a handle rigidly secured to the cross bar generally equidistant between the pair of wheels, the handle having a lower section extending below the cross bar and generally midway between the two wheel bars and an upper section, a hinge member secured to the lower section, the upper section being mounted to rotate on the hinge member, a retaining member mounted to slide on the upper section and to engage the lower section;
- a shelf mounted to rotate on the cart from an upper position against the cart to a lower position generally at ninety degrees from the upper position, the self having an underside; and
- a cradle affixed to the lower section of the handle to retain the articles.

5. A cart according to claim 4 further including a hanger mounted on the upper section of the handle over the wheels.

* * * * *